(12) United States Patent
Beverly

(10) Patent No.: US 11,787,239 B2
(45) Date of Patent: Oct. 17, 2023

(54) INFLATION/DEFLATION SYSTEM

(71) Applicant: Parker-Hannifin Corporation, Cleveland, OH (US)

(72) Inventor: James Alden Beverly, Kalamazoo, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 677 days.

(21) Appl. No.: 16/762,529

(22) PCT Filed: Jan. 24, 2019

(86) PCT No.: PCT/US2019/014894
§ 371 (c)(1),
(2) Date: May 8, 2020

(87) PCT Pub. No.: WO2019/147766
PCT Pub. Date: Aug. 1, 2019

(65) Prior Publication Data
US 2021/0188021 A1    Jun. 24, 2021

Related U.S. Application Data

(60) Provisional application No. 62/621,731, filed on Jan. 25, 2018.

(51) Int. Cl.
*B60C 23/00* (2006.01)
*G05D 16/20* (2006.01)

(52) U.S. Cl.
CPC ..... *B60C 23/00354* (2020.05); *G05D 16/204* (2013.01)

(58) Field of Classification Search
CPC ............ B60C 23/00354; B60C 23/003; G05D 16/204
See application file for complete search history.

(56) References Cited

U.S. PATENT DOCUMENTS

| 4,641,698 A | * | 2/1987 | Bitonti | .............. B60C 23/00372 152/416 |
| 6,098,682 A | * | 8/2000 | Kis | ................... B60C 23/00372 137/224 |

(Continued)

FOREIGN PATENT DOCUMENTS

| DE | 112005003020 | 1/2008 |
| EP | 2196336 | 6/2010 |

OTHER PUBLICATIONS

International Search Report and Written Opinion issued by WIPO for corresponding International Application No. PCT/US2019/014894 dated Mar. 29, 2019.

*Primary Examiner* — Jason R Bellinger
(74) *Attorney, Agent, or Firm* — Renner, Otto, Boisselle & Sklar, LLP

(57) ABSTRACT

An inflation/deflation system for a tire in tire systems such as those having an inner bladder and an outer ground engaging tire is provided in which the inflation/deflation system is adapted to inflate/deflate a tire, inflate a bladder, and inflate a tire utilizing pressurized air from the bladder. The system utilizes a specialized valve and passageway system which utilizes pressurized fluid to operate a timer wheel valve to inflate the tire and/or bladder without requiring electric power at the wheel and utilizes a low power function to inflate the tire from the bladder. The utilization of the bladder to provide a quick tire inflation is particularly useful in agricultural applications utilizing tire with large volumes.

16 Claims, 2 Drawing Sheets

(56) References Cited

U.S. PATENT DOCUMENTS

| | | | |
|---|---|---|---|
| 7,963,307 B2 * | 6/2011 | Rudolf | B60C 23/00372 |
| | | | 152/416 |
| 10,131,192 B2 | 11/2018 | Jabcon et al. | |
| 10,377,188 B2 * | 8/2019 | Couppee | B60C 23/00363 |

* cited by examiner

INFLATION/DEFLATION SYSTEM

CROSS REFERENCE TO RELATED APPLICATIONS

The present application is a national phase of International Application No. PCT/US2019/014894 filed Jan. 24, 2019, which claims the benefit of the filing date of U.S. Provisional Patent Application Ser. No. 62/621,731, filed Jan. 25, 2018, the disclosures of which are hereby incorporated herein by reference.

TECHNICAL FIELD

The present invention relates, in general, to an inflation/deflation system for tire in tire systems such as those having an inner bladder and an outer ground engaging tire, and more particularly, to an inflation/deflation system which can inflate/deflate a tire, inflate a bladder, and inflate a tire utilizing pressurized air from the bladder.

BACKGROUND

Central Tire Inflation Systems (CTIS) are a widely recognized technology applied to on/off highway and military wheeled vehicles to facilitate tire pressure adjustment in order to provide enhanced mobility, increased traction and improved fuel economy when adapting to varying load and terrain conditions. Application of CTIS to agricultural vehicles is an emerging market opportunity, which provides unique challenges to current CTIS implementations.

A primary limitation of CTIS applied to agricultural vehicles is the limited output flow capacity of the on-board vehicle air compressor required to quickly re-inflate the large volumetric tires typical of agricultural applications. An additional limitation is conventional axle air sealing systems may not be cable of flowing the increased air volume should high capacity air supply systems be incorporated.

Another challenge to incorporating tire in tire technology into CTIS strategy is that it requires a means of managing pressure in both inner and outer tire cavities. This also applies to external auxiliary reservoirs mounted on a wheel end incorporating conventional tires. In one prior art system, two air conduits are incorporated into the rotary union located at each wheel end. This approach is costly and requires additional real estate within the wheel end.

Alternatively, CTIS associated controls, valves and measurement devices can reside on the wheel end to accommodate a single passage rotary air seal implementation. These components are thus susceptible to the extreme operating environment of the rotating wheel given the operating profile of an agricultural vehicle. These components also demand considerable electrical power consumption at the wheel, requiring a means to charge its power source. Many such strategies require this remote power source to be available for all CTIS operations. When the power source is depleted, the CTIS is completely inoperable with no fall back to conventional inflate and deflate control. The wheel mounted components such as the atmospheric vent may be susceptible to failures due to contamination ingestion at the wheel. These and other problems in the prior art show a need for an improved inflation system for tire in tire applications.

SUMMARY

At least one embodiment of the invention provides an inflation/deflation system for a vehicle having a tire/wheel assembly including a first pressure chamber and a second pressure chamber, the vehicle having a source of pressurized fluid separate from the tire/wheel assembly and a connection to atmosphere separate from the tire/wheel assembly, the inflation/deflation system comprising: a valve and fluid passageway arrangement attached to a rim of the tire/wheel assembly; a first single fluid passageway extending from the vehicle to the valve and fluid passageway arrangement through a rotary union, the first fluid passageway selectively (1) closed to fluid flow, (2) coupled to the source of pressurized fluid, and (3) coupled to the connection to atmosphere; the valve and fluid passageway arrangement having a first state coupling the first fluid passageway to the first pressure chamber; a second state coupling the first fluid passageway to the second pressure chamber; and a third state coupling the second pressure chamber to the first pressure chamber.

BRIEF DESCRIPTION OF THE DRAWINGS

Embodiments of this invention will now be described in further detail with reference to the accompanying drawings, in which.

DETAILED DESCRIPTION OF THE DRAWING

The principles of this invention have particular application to an inflation/deflation system for allowing inflation and deflation of vehicle tire in tire system, and thus will be described below chiefly in this context. It will be appreciated that principles of this invention may be applicable to other fluid systems where it is desirable to reduce or increase pressure of a fluid in a reservoir using a local pressure source such as a bladder or accumulator.

Figure 1:
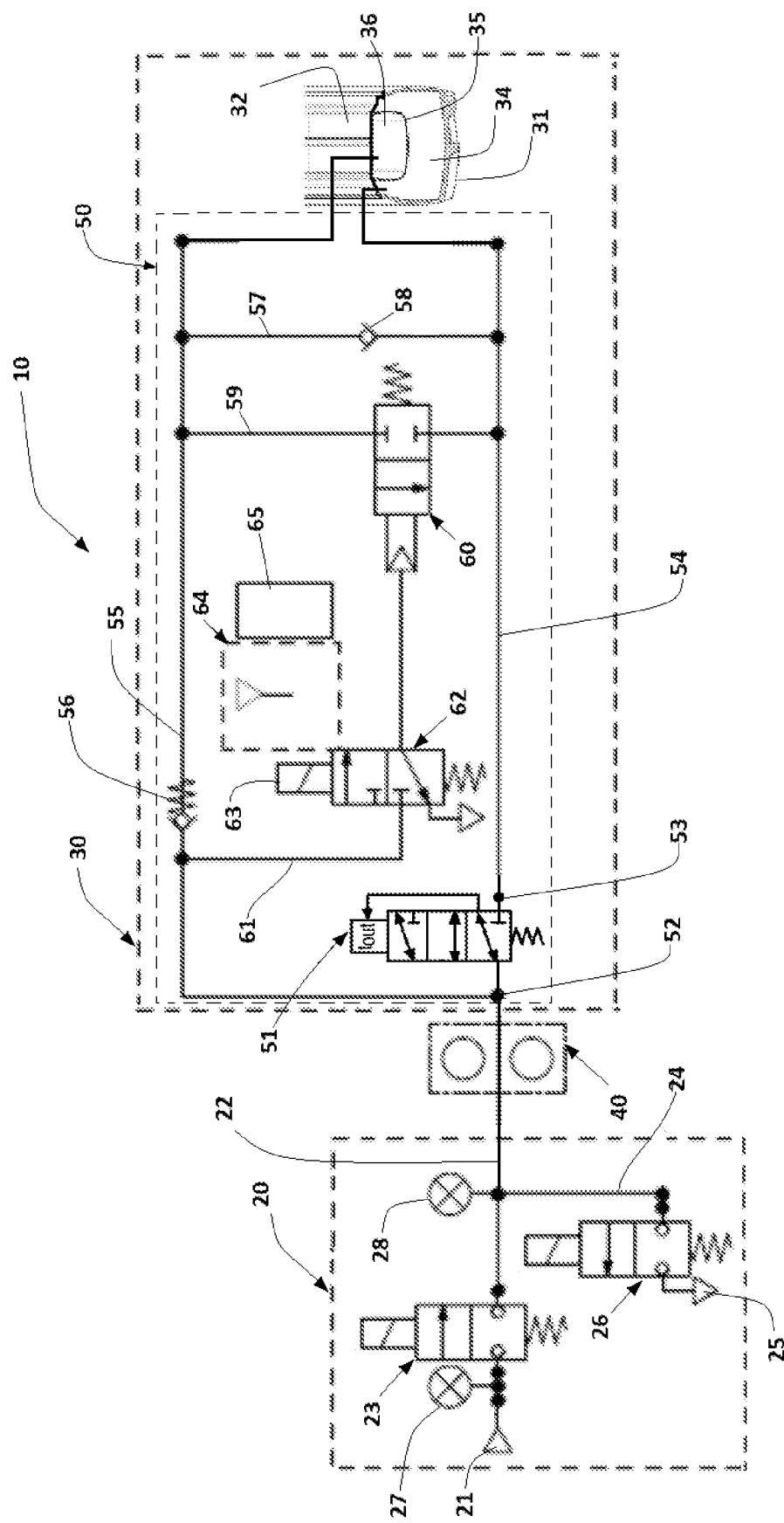
FIG. 1 is a schematic of an embodiment of the inflation/deflation system of the present invention.

An embodiment of the inflation/deflation system 10 of the present invention is shown schematically in FIG. 1 with box 20 representing a vehicle, box 30 representing a tire/wheel assembly mounted on the vehicle 20, and a rotary union 40 therebetween. The tire/wheel assembly 30 includes a tire 31 mounted on a rim 32 and forming a first pressure chamber 34 and a bladder 35 mounted on the rim 32 and forming a second pressure chamber 36, which are shown in partial cross-section on the schematic of FIG. 1. It is noted that the invention is applicable to other configurations, i.e.—where the bladder and/or valves are mounted to the axle hub or wheel end, and that the invention is not limited to the configuration shown in the figures.

The vehicle 20 includes a pressure source 21, a fluid passageway 22 and supply valve 23 in the fluid passageway 22 to selectively open and close the fluid passageway 22. A pressure sensor 27 is positioned in fluid passageway 22 between the pressure source 21 and supply valve 23. A second pressure sensor 28 is positioned in fluid passageway 22 on the opposite side of supply valve 23 from pressure sensor 27. The vehicle 20 may include a fluid passageway 24 connecting fluid passageway 22 to a source of atmosphere 25. A vent valve 26 is in the fluid passageway 24 to selectively open and close the fluid passageway 24. The supply valve 23 and vent valve 26 are typically on off solenoid valves that are controlled by a controller (not shown) based on information it receives from the pressure sensor 28 as to whether inflation or deflation is needed at either the first pressure chamber 34 or the second pressure chamber 36. The pressure source 21, also referred to herein as a source of pressurized fluid, is typically a source of compressed air or nitrogen. The pressure source 21 is positioned on the vehicle 20 separate from the tire/wheel assembly 30. The access point to the source of atmosphere 25 may also be positioned separate from the tire/wheel assembly 30.

The inflation/deflation system 10 comprises a valve and fluid passageway arrangement 50 attached to the rim 32 of the tire/wheel assembly 30 or attached to the axle hub or wheel end (not shown). The valve and fluid passageway arrangement 50 includes a plurality of valves and fluid passageways including valve 51. Valve 51 has a first inlet/outlet port 52 and a second inlet/outlet port 53. The Valve 51 has a closed position (as shown in FIG. 1) preventing flow from the first inlet/outlet port 52 to the second inlet/outlet port 53 and an open position allowing flow from the first inlet/outlet port 52 to the second inlet/outlet port 53.

Valve 51 is shown as a timer wheel valve of the type and operation as disclosed in U.S. Pat. No. 10,131,192, filed on Sep. 28, 2015, issued on Dec. 20, 2018, and entitled Central Tire Inflation/Deflation System with a Timed Function CTIS Wheel Valve which is hereby incorporated by reference. In addition to the open and closed positions, the valve 51, referred to hereafter as timer wheel valve 51, has a reset or initialization position in which the valve is closed. For example, when the pressure at the first inlet/outlet 52 of the timer wheel valve 51 reaches a reset pressure threshold ("the reset pressure or initialization pressure") above a corresponding pressure at the second inlet/outlet port 53, timer wheel valve 51 transitions from the closed position to the reset position. The reset timer wheel valve 51 is still in a closed condition, however, when the pressure at first inlet/outlet port 52 is lowered to or below an opening threshold pressure with respect to the pressure at the second inlet/outlet port 53, the timer wheel valve 51 will transition from the reset position to an open position. The timer wheel valve 51 may be configured to transition from the reset position to the open position in a prescribed period of time reset. For example, the valve 51 may be configured to transition from the reset position to the open position in 0.5 seconds or less once the opening pressure threshold is achieved as the pressure at the first inlet/outlet port 52 and approaches the pressure at the second inlet/outlet port 53. Once the tire wheel valve 51 is in the open position, it will stay in the open position for a prescribed period of time after which the valve 51 will transition to the closed position. The valve 51 may be configured to transition from the open position to the closed position in a prescribed period of time open, i.e. thirty seconds (as example only and not limited to a particular time). The timer wheel valve 51 operates by changes in pressure on the valve and does not require electric power to operate. However, it is contemplated that a typical solenoid on/off valve could be used in a system having electrical power at the tire/wheel assembly and the invention is not limited to a particular valve except as claimed.

The fluid passageway 22 extends from the vehicle 20 through the rotary union 40 and is fluidly connected to the first inlet/outlet 52 of the timer wheel valve 51. In one embodiment the fluid passageway 22 is a single passageway. The fluid passageway 22 is selectively: (1) closed to fluid flow when the supply valve 23 and the vent valve 26 are closed; (2) coupled to the source of pressurized fluid 21 when the supply valve 23 is open and the vent valve 26 is closed; and (3) coupled to a source of atmosphere 25 when the supply valve 23 is closed and the vent valve 26 is open.

A fluid passageway 54 fluidly connects the second inlet/outlet port 53 of the timer wheel valve 51 to the first pressure chamber 34. Fluid passageway 54 allows the inflation of the tire 31 when the fluid passageway 22 is coupled to the source of pressurized fluid 21 and the timer wheel valve 51 is in the open position. Fluid passageway 54 allows the deflation of the tire 31 when the fluid passageway 22 is coupled to the source of atmosphere 25 and the timer wheel valve 51 is in the open position.

Figure 2:
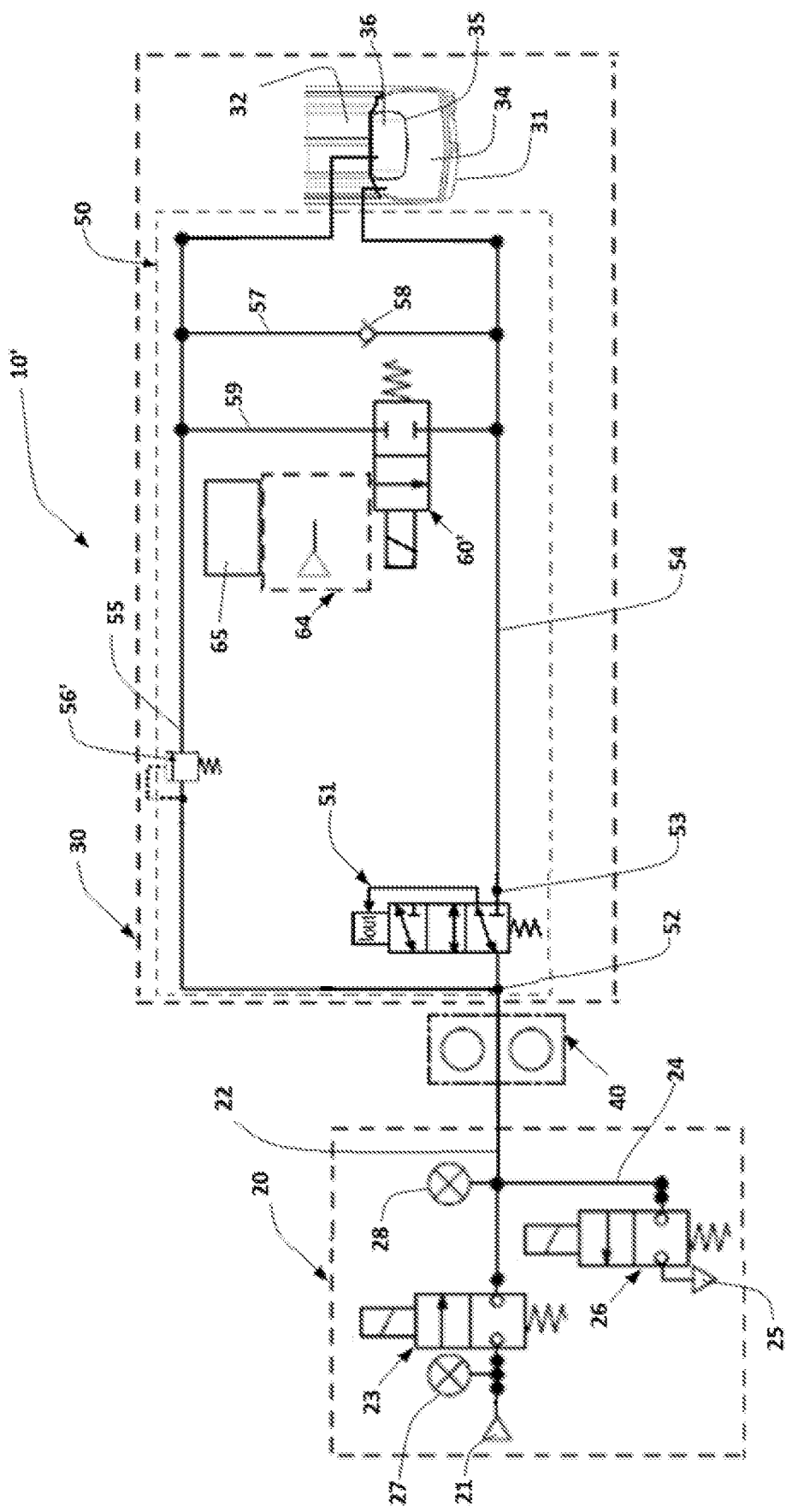
FIG. 2 is a schematic of a second embodiment of the inflation/deflation system of the present invention.

A fluid passageway 55 fluidly connects the fluid passageway 22 to the second pressure chamber 36. Fluid passageway 55 is shown connected to fluid passageway 22 at the first inlet/outlet port 52 of the timer wheel valve 51. A one-way valve 56, typically either a spring loaded check valve as shown in FIG. 1 or a pressure relief valve 56' as shown in FIG. 2 is positioned in the fluid passageway 55 preventing flow through the valve 56 unless the fluid pressure entering the fluid passageway 55 from the fluid passageway 22 is above a predetermined pressure threshold ("check valve threshold pressure"). In a typical agricultural application, this check valve threshold pressure may be set higher than any anticipated tire pressure and higher than the timer wheel valve 51 initialization pressure applicable to the anticipated tire pressure, as an example, 85 psi is a typical check valve threshold pressure in such applications. The high check valve threshold pressure allows the system 10 to perform all desired lower pressure actions such as tire inflate, deflate, and pressure measure routines without any interaction with the second pressure chamber 36 (when the pressure chamber 36 is at a pressure above the pressure of the supply pressure). The valve 56 prevents fluid flow through the fluid passageway 55 in the direction from the second pressure chamber to the fluid passageway 22. Fluid passageway 55 allows the inflation of the bladder 35 when the fluid passageway 22 is coupled to the source of pressurized fluid 21, the pressurized fluid is above a predetermined valve pressure threshold of valve 56, and the wheel valve 51 is in the initialized closed position.

A fluid passageway 57 connects fluid passageway 54 to fluid passageway 55. A second check valve 58 is positioned in the fluid passageway 57 preventing flow through fluid passageway 57 in the direction from the fluid passageway 55 to fluid passageway 54. Check valve 58 ensures that the pressure within the tire 31 cannot exceed the pressure within bladder 35.

A fluid passageway 59 connects fluid passageway 54 to fluid passageway 55. A valve 60, referred to as a transfer valve, is positioned in fluid passageway 59, the transfer valve 60 having a first position preventing flow through the transfer valve 60 and a second position allowing flow through the transfer valve 60. A fluid passageway 61 connects the fluid passageway 55 to the transfer valve 60. Transfer valve 60 is a normally closed pneumatically piloted on/off valve having a predetermined actuation pressure to move the transfer valve 60 from the first position to the second position. Fluid passageway 61 is connected to fluid passageway 55 on an upstream side of pressure relief or check valve 56 while fluid passageways 57 and 59 are connected to fluid passageway 55 on a downstream side of pressure relief or check valve 56.

A valve 62 is positioned in the fluid passageway 61 having a first position preventing flow through the valve 62 and a second position allowing flow through the valve 62. Valve 62 is a normally closed, low power solenoid operated 3,2 valve. The valve 62 may be a wireless piezo valve, which are commonly use in applications where low power consumption due to its momentary power requirement to transition positions and remote actuation is desired. The valve 62 is operated by a switch 63 which is a piezo-electric element suitable for the application, which is activated and deactivated by a remotely controlled signal. The signal may be an RF signal or other appropriate signal that is detected by the receiver 64. The signal may be encoded so that only a particular valve 62 operates in response to a signal received by receiver 64. The receiver 64 and the valve 63 may be powered by a power source 65. Power source 65 may be a battery or any other suitable power source. The power source 65 may be recharged if needed as known in the art such as those disclosed in European Patent 2 196 336 (B1) granted on Oct. 3, 2012 and entitled Tyre inflation pressure control system.

In operation, the inflation/deflation system 10 has a first state coupling the source of pressurized fluid 21 or the source of atmosphere 25 to the first pressure chamber 34; a second state coupling the source of pressurized fluid 21 to the second pressure chamber 36; and a third state coupling the second pressure chamber 36 to the first pressure chamber 31. The first state is achieved when the timer wheel valve 51 is in the open position and either the supply valve 23 or the vent valve 26 is in an open position. The second state is achieved when the timer wheel valve 51 is in a closed initialized position, the supply valve 23 is in an open position, and the pressurized fluid from the pressure source 21 is above the predetermined valve pressure threshold of valve 56. The third state is achieved when the timer wheel valve 51 is in a closed initialized position, the supply valve 23 is in an open position, valve 62 is in an open position, the pressure of the pressurized fluid from the pressure source 21 is above the predetermined actuation pressure of the transfer valve 60 such that transfer valve 60 is in an open position.

The operation of the inflation/deflation system 10 to fill the first pressure chamber 34 is now described. The supply valve 23 is opened with pressure source 21 above the initialization pressure such that the timer wheel valve 51 changes from the closed position to initialized position. The pressure from the pressure source is lowered to a pressure at or below the opening threshold of the timer wheel valve 51 allowing the timer wheel valve to transition from the initialized position to the open position. The timer wheel valve 51 will return to a closed position after a predetermined time, typically around 30 seconds. When the timer wheel valve 51 is open, the vehicle tire 31 can be inflated or deflated as directed by the controller based on information from the pressure sensor 28 by opening or closing the supply valve 23 and the vent valve 26 as needed.

The operation of the inflation/deflation system 10 to fill the second pressure chamber 36 is now described. The timer wheel valve 51 is in a normally closed position as depicted in FIG. 1. Pressurized fluid is provided at a pressure above the initialization pressure of the timer wheel valve 51 and above the valve threshold pressure of valve 56. The controller opens the supply valve 23 to provide the pressurized fluid to first inlet/outlet port 52 causing the timer wheel valve 51 to move to and stay in an initialization position where the timer wheel valve 51 is closed. The pressurized fluid bypasses the timer wheel valve 51 through fluid passageway 55 where it opens the valve 56 and inflates the second pressure chamber 36. The pressure in the second pressure chamber 36 is determined by the controller based on pressure sensor 28. The controller can periodically de-energize the solenoid of the supply valve 23 to allow the pressure sensor 28 to measure the current pressure of second pressure chamber 36. Once the second pressure chamber 36 has achieved the desired inflation pressure, the controller will de-energize the supply valve 23, and the solenoid of the vent valve 26 will be momentarily energized causing the pressure at the first inlet/outlet 52 to fall below a predetermined timer wheel valve 51 open pressure and causing the timer wheel valve 51 to open. The one-way valve 56 will prevent deflation of the second pressure chamber 36 through the vent valve 26. After the vent valve 26 is de-energized and vent valve 26 is closed, the timer wheel valve 51 will remain open until timed out, but there is no fluid flow through the timer wheel valve 51 as both the supply valve 23 and vent valve 26 are closed. After the timer wheel valve 51 has timed out and returns to the closed position, the fluid passageways 22, 24 can be vented by again momentarily energizing vent valve 26 as usual.

The inflation of the bladder 35 can be accomplished when the inflation/deflation system 10 is not being used to inflate or deflate the tire 31. The inflation/deflation system 10 will take advantage of this idle time to use the conventionally sized fluid supply compressor (not shown) provided on the vehicle 20 to fill the second pressure chamber 36 to a pressure substantially higher than then the maximum anticipated tire inflation pressure required. This high pressure charged volume in the second pressure chamber 36 would be available for extremely fast re-inflation of the ground tire 31, with approximately 30% less overall volume of the ground tire 31 due to the resulting displacement of the inner tire or bladder 35 in the tire 31.

The operation of the inflation/deflation system 10 to inflate the tire 31 by using pressurized fluid from the bladder 35 is now described. The timer wheel valve 51 is in a normally closed position as depicted in FIG. 1. When supply pressure measured at sensor 27 is determined to be above the pilot pressure required to operate transfer valve 60 and the initialization pressure required for timer wheel valve 51, the controller opens the supply valve 23 to provide the pressurized fluid to first inlet/outlet port 52 causing the timer wheel valve 51 to move to an initialization position. The controller also sends a signal to the receiver 64 to open the electrically actuated valve 62. The pressurized fluid bypasses the timer wheel valve 51 through fluid passageway 55. The one-way valve 56 prevents flow through the relief valve or check valve 56. The pressurized fluid flows through fluid passageway 61 and valve 62 to open the pneumatically piloted valve 60 in fluid passageway 59 which fluidly connects the second pressure chamber 36 to the first pressure chamber 34 allowing the high pressure fluid in the bladder 35 to inflate the tire 31. The amount of pressurized air volume required to inflate the tire from the bladder to the desired pressure and therefore the appropriate time to energize the transfer valve shall be estimated by means of a predictive adapting algorithm. This algorithm estimates the vehicle tire size and therefore applicable volumes of the tire and its associated bladder. Once this transfer time is complete, the system shall measure tire pressure and adjust accordingly using the previously described control methods. In order to measure tire pressure, timer wheel valve 51 must again be opened as previously described by de-energizing supply valve 23 and momentarily energizing vent valve 26. Note that this will also reduce pressure in fluid passageway 55 such that valve 60 will close. When inflating the tire 31 from the bladder 35 is assumed to be complete, the controller will turn off valve 62, thus removing pilot pressure supplied to valve 60 and valve 60 will close. At this point, the bladder 35 should have been sufficiently utilized for fast inflation of the tire 31, and normal inflate, deflate, and measure control will remain available for additional tire pressure adjustment in the same manner as the prior art inflation/deflation system.

A second embodiment of the invention is shown in FIG. 2 as inflation/deflation system 10' which is identical to the system 10 except that 1) the valve 56' is depicted as a relief valve instead of a spring loaded check valve; 2) fluid passageway 61 and valve 62 are removed; and 3) pressure operated transfer valve 60 has been replaced by valve 60' which operates like former valve 62 to remotely open and close fluid passageway 59 to transfer pressurized fluid from the second pressure chamber 36 to the first pressure chamber 34. In the inflation/deflation system 10', the third state is achieved when timer wheel valve 51 is in a first closed position and the transfer valve 60' is activated to move from a closed first position to an open second position. This allows pressurized fluid in the second pressure chamber 36 to flow into the first pressure chamber 34. During the third state the supply valve 23 and vent valve 26 are typically in the closed first position, however, it may be desirable to open the supply valve 23 such that the pressure source 21 is also utilized to inflate the first pressure chamber 34. This feature may be utilized to speed up the inflation process which is important with large agricultural tire volumes.

As in the prior art, the inflation/deflation system 10 is utilized in a system having a controller having communication lines to operably connect the controller to the pressure source and the control system to allow operation of each timer wheel valve 51 as more than one tire in tire is contemplated such that any number of tire in tires may be utilized.

Also, wireless control of electrically actuated valves mounted to a wheel for the purpose of tire inflation are known, and obvious to those skilled in the art. Examples of wireless communication methods include either radio frequency or inductive coupled. An embodiment of the wheel end electrical power source if RF communication is implemented would be to incorporate a charging method for the power source located at the wheel. The methodology of generating electrical power, including a centrifugal or mechanical generator on a rotating device are well known and contemplated herein.

A portion of the inflation/deflation system 10, 10' can be used as an add-on to prior art CTIS systems or customized as a system optimized for the additional capabilities of the inflation/deflation system 10, 10'. The inflation/deflation system 10, 10' removes the need of incorporating large and costly auxiliary driven air compressors in conjunction with high flow air sealing systems at the tire/wheel assembly 30. The high capacity reservoir of the second pressure chamber 36 located on the tire/wheel assembly 30 allows quick inflation of the tire 31.

At least one embodiment of the invention provides an inflation/deflation system comprising: a tire/wheel assembly including a first pressure chamber and a second pressure chamber; a source of pressurized fluid located separate from the tire/wheel assembly; a first fluid passageway fluidly connecting the tire/wheel assembly to the source of pressurized fluid; a first valve positioned in the first fluid passageway to selectively open and close the first fluid passageway; a second fluid passageway connecting the first fluid passageway to a source of atmosphere; a second valve positioned in the second fluid passageway to selectively open and close the second fluid passageway; the tire wheel assembly further comprising: a third valve mounted on a wheel rim of the tire/wheel assembly, the third valve having a first inlet/outlet port and a second inlet/outlet port, the first inlet/outlet port fluidly connected to the first fluid passageway, the third valve having a closed position preventing flow from the first inlet/outlet port to the second inlet/outlet port, the third valve having an open position allowing flow from the first inlet/outlet port to the second inlet/outlet port; a third fluid passageway connecting the second inlet/outlet port to the first pressure chamber; a fourth fluid passageway connecting first fluid passageway to the second pressure chamber; a relief or check valve in the fourth fluid passageway preventing flow through the relief or check valve unless the fluid pressure entering the fourth fluid passageway is above a predetermined valve pressure threshold; a fifth fluid passageway connecting the third fluid passageway to the fourth fluid passageway; a check valve in the fifth fluid passageway preventing flow from the fourth fluid passageway to the third fluid passageway; a sixth fluid passageway connecting the fourth fluid passageway to the third fluid passageway; a fourth valve in the sixth fluid passageway having a first position preventing flow through the fourth valve and a second position allowing flow through the fourth valve; a seventh fluid passageway connecting the fourth fluid passageway to the fourth valve, the fourth valve being a pressure operated valve having a predetermined actuation pressure to move the fourth valve from the first position to the second position; a fifth valve in the seventh fluid passageway having a first position preventing flow through the fifth valve and a second position allowing flow through the fifth valve; the fourth fluid passageway is connected to the first fluid passageway at the first inlet/outlet of the third valve.

At least one embodiment of the invention provides a vehicle comprising: a tire mounted on a rim to define a first pressure chamber and a bladder mounted on the rim to define a second pressure chamber; a source of pressurized fluid mounted on the vehicle separate from the rim; a rotary union having a single fluid passageway therethrough; an inflation/deflation system mounted on the rim; the single fluid passageway through the rotary union being fluidly coupled to the inflation/deflation system and selectively (1) closed, (2) coupled to the source of pressurized fluid on the vehicle, and (3) coupled to atmosphere; the inflation/deflation system having a first state coupling the single fluid passageway through the rotary union to the first pressure chamber; a second state coupling the single fluid passageway through the rotary union to the second pressure chamber; and a third state coupling the second pressure chamber to the first pressure chamber.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention. For example, as previously discussed, instead of a tire in tire application, the reservoir may be an accumulator mounted at the wheel end and used in the same manner as the bladder reservoir to inflate the tire in accordance with the present invention. Also, it is noted that in the claims, the check valves and/or pressure relief valves are claimed specifically as check valves and/or pressure relief valves and not generally referred to as a "valve" alone such a numbered valve.

What is claimed is:

1. An inflation/deflation system for a vehicle having a tire/wheel assembly including a first pressure chamber and a second pressure chamber, the vehicle having a source of pressurized fluid separate from the tire/wheel assembly and a connection to atmosphere separate from the tire/wheel assembly, the inflation/deflation system comprising:

a valve and fluid passageway arrangement attached to the to the tire/wheel assembly;

a single first fluid passageway extending to the valve and fluid passageway arrangement through a rotary union, the first fluid passageway selectively (1) closed to fluid flow, (2) coupled to the source of pressurized fluid, and (3) coupled to the connection to atmosphere;

the valve and fluid passageway arrangement having a first state coupling the first fluid passageway to the first pressure chamber without coupling the first fluid passageway to the second pressure chamber; a second state coupling the first fluid passageway to the second pressure chamber without coupling the first fluid passageway to the first pressure chamber; and a third state coupling the second pressure chamber to the first pressure chamber.

2. An inflation/deflation system for a vehicle having a tire/wheel assembly including a first pressure chamber and a second pressure chamber, the vehicle having a source of pressurized fluid separate from the tire/wheel assembly and a connection to atmosphere separate from the tire/wheel assembly, the inflation/deflation system comprising:

a valve and fluid passageway arrangement attached to the to the tire/wheel assembly;

a single first fluid passageway extending to the valve and fluid passageway arrangement through a rotary union, the first fluid passageway selectively (1) closed to fluid flow, (2) coupled to the source of pressurized fluid, and (3) coupled to the connection to atmosphere;

the valve and fluid passageway arrangement having a first state coupling the first fluid passageway to the first pressure chamber; a second state coupling the first fluid passageway to the second pressure chamber; and a third state coupling the second pressure chamber to the first pressure chamber;

wherein the valve and fluid passageway arrangement further comprises:

a first valve having a first inlet/outlet port and a second inlet/outlet port;

the first fluid passageway fluidly connected to the first inlet/outlet of the first valve, the first valve having a first position preventing flow from the first inlet/outlet to the second inlet/outlet, a second position preventing flow from the first inlet/outlet to the second inlet/outlet, and a third position allowing flow from the first inlet/outlet to the second inlet/outlet, the first valve transitioning from the first position to the second position when the first inlet/outlet of the first valve is at an initialization pressure, the first valve transitioning from the second position to the third position when the pressure at the first inlet/outlet of the first valve is lowered from the initialization pressure, the first valve transitioning from the third position to the first position after a predetermined time;

a second fluid passageway fluidly connecting the second inlet/outlet port of the first valve to the first pressure chamber;

a third fluid passageway connecting the first fluid passageway to the second pressure chamber;

a pressure relief valve or a first check valve in the third fluid passageway preventing flow through the pressure relief valve or first check valve unless the pressurized fluid entering the third fluid passageway from the first fluid passageway is above a predetermined valve pressure threshold;

a fourth fluid passageway connecting the second fluid passageway to the third fluid passageway;

a second check valve in the fourth fluid passageway preventing flow from the third fluid passageway to the second fluid passageway.

3. The inflation/deflation system of claim 2, wherein the first state is achieved when the first valve is in the third position.

4. The inflation/deflation system of claim 2, wherein the second state is achieved when:
i.) the first valve is in the second position,
ii.) the first passageway is fluidly coupled to the source of pressurized fluid, and
iii.) the source of pressurized fluid is at a pressure above the predetermined valve pressure threshold of the pressure relief valve or the first check valve.

5. The inflation/deflation system of claim 2, wherein the first pressure chamber is automatically connected to the second pressure chamber through the second check valve whenever the pressure in the first pressure chamber is higher that the pressure in the second pressure chamber.

6. The inflation/deflation system of claim 2, wherein the valve and fluid passageway arrangement further comprises:
a fifth fluid passageway connecting the third fluid passageway to the second fluid passageway;
a second valve in the fifth fluid passageway having a first position preventing flow through the second valve and a second position allowing flow through the second valve.

7. The inflation/deflation system of claim 6, wherein the valve and fluid passageway arrangement further comprises:
a sixth fluid passageway connecting the fourth fluid passageway to the second valve, the second valve being a pressure operated valve having a predetermined actuation pressure to move the second valve from the first position to the second position;
a third valve in the fourth fluid passageway having a first position preventing flow through the third valve and a second position allowing flow through the third valve.

8. The inflation/deflation system of claim 7, wherein the third state is achieved when:
i.) the first valve is in the second position,
ii.) the first passageway is fluidly coupled to the source of pressurized fluid,
iii.) the source of pressurized fluid is at above the predetermined actuation pressure of the second valve,
iv.) the second valve is in the second position, and
v.) the third valve is in the second position.

9. The inflation/deflation system of claim 7, further comprising a remote control for operating the third valve.

10. The inflation/deflation system of claim 9, wherein the remote control is provided by a radio frequency receiver.

11. The inflation/deflation system of claim 10, wherein the third valve is a solenoid operated valve.

12. The inflation/deflation system of claim 11, wherein the third valve is powered by a battery.

13. The inflation/deflation system of claim 11, wherein the third valve is the only valve of the valve and fluid passageway arrangement that is an electrically actuated valve.

14. The inflation/deflation system of claim 1, wherein a tire of the tire/wheel assembly mounted on the rim defines the first pressure chamber and a bladder mounted on the rim defines the second pressure chamber.

15. The inflation/deflation system of claim 2, wherein the third fluid passageway is connected to the first fluid passageway at a first inlet/outlet of a third valve.

16. An inflation/deflation system for a vehicle having a tire/wheel assembly including a first pressure chamber and a second pressure chamber, the vehicle having a source of pressurized fluid separate from the tire/wheel assembly and a connection to atmosphere separate from the tire/wheel assembly, the inflation/deflation system comprising:
  a valve and fluid passageway arrangement attached to the to the tire/wheel assembly;
  a single first fluid passageway extending to the valve and fluid passageway arrangement through a rotary union, the first fluid passageway selectively (1) closed to fluid flow, (2) coupled to the source of pressurized fluid, and (3) coupled to the connection to atmosphere;
  the valve and fluid passageway arrangement having a first state coupling the first fluid passageway to the first pressure chamber; a second state coupling the first fluid passageway to the second pressure chamber; and a third state coupling the second pressure chamber to the first pressure chamber;
  wherein achieving the first state and the second state do not require electrical power at the tire/wheel assembly.

\* \* \* \* \*